United States Patent
Gelderie et al.

(10) Patent No.: US 6,479,155 B1
(45) Date of Patent: *Nov. 12, 2002

(54) FIRE-RESISTANT LAMINATED GLASS PANE ASSEMBLY

(75) Inventors: Udo Gelderie, Stolberg; Simon Frommelt, Haan, both of (DE)

(73) Assignee: Vetrotech Saint-Gobain International AG, Walchwill (CH)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/109,838

(22) Filed: Jul. 2, 1998

(30) Foreign Application Priority Data

Jul. 9, 1997 (DE) .......................... 197 29 336

(51) Int. Cl.$^7$ ............................... B32B 17/06
(52) U.S. Cl. ............... 428/426; 428/410; 428/421; 428/425.6; 428/442; 428/451; 428/920
(58) Field of Search ................. 428/410, 426, 428/428, 432, 701, 702, 920, 421, 425.6, 442, 451, 423.1, 441

(56) References Cited

U.S. PATENT DOCUMENTS

| | | | | |
|---|---|---|---|---|
| 4,071,649 A | * | 1/1978 | Jacquemin et al. | 428/215 |
| 4,104,427 A | * | 8/1978 | Nolte et al. | 428/68 |
| 4,444,825 A | * | 4/1984 | Vanderstukken et al. | 428/215 |
| 4,762,746 A | * | 8/1988 | Wesch et al. | 428/305.5 |
| 5,434,006 A | * | 7/1995 | Geolff et al. | 428/428 |
| 5,565,273 A | * | 10/1996 | Egli et al. | 428/426 |
| 5,895,721 A | * | 4/1999 | Naoumenko et al. | 428/429 |
| 5,908,704 A | * | 6/1999 | Friedman et al. | 428/426 |

FOREIGN PATENT DOCUMENTS

EP   0 524 418 A1   1/1993

* cited by examiner

Primary Examiner—Deborah Jones
Assistant Examiner—Jennifer McNeil
(74) Attorney, Agent, or Firm—Pennie & Edmonds LLP

(57) ABSTRACT

A fire-resistant laminated glass pane assembly comprises a glass-ceramic pane resistant to high temperatures and having rough light-diffusing surfaces, the said pane being joined, on each of its two faces, to a silicate glass pane by means of transparent intermediate layers having a refractive index corresponding to the refractive index of the glass and the glass-ceramic. Transparent intermediate plies consist of a thermoplastic polymer having a high splinter fixation effect, and the silicate glass panes consist of tempered float glass. Fire-retarding glasses of this type not only have a high fire-retarding effect, but also withstand the so-called extinguishing water test and, moreover, have safety glass properties with increased safety in respect of injuries caused by splinters.

10 Claims, No Drawings

FIRE-RESISTANT LAMINATED GLASS PANE ASSEMBLY

FIELD OF THE INVENTION

The present invention relates to a fire-resistant laminated glass pane assembly comprising a glass-ceramic pane resistant to high temperatures and to thermal shocks and having rough light-diffusing surfaces, the said pane being joined, on each of its two faces, to a silicate glass pane by means of transparent intermediate layers having a refractive index corresponding to the refractive index of the glass-ceramic pane.

BACKGROUND OF THE INVENTION

A laminated glass pane assembly of this type is known from the document EP-A-O 524, 418. The glass-ceramic pane has a particularly low coefficient of thermal expansion and a relatively high softening temperature and is thereby suitable, to a particular extent, for being used as fire-retarding glass. The glass-ceramic panes, are due to their extremely low coefficient of thermal expansion, so insensitive to rapid temperature variations that they even withstand the so-called extinguishing water test, during which a jet of extinguishing water is projected onto a glass-ceramic pane heated to 800° C.

Owing to the way in which they are manufactured, however, glass-ceramic panes possess a rough surface and do not have clear transparency on account of their light-diffusing effect. So that it can be used, nevertheless, as transparent fire-retardant glazing, without a complicated grinding-down and polishing operation, the glass-ceramic pane in the known fire-retarding glass is combined optically with clear transparent silicate glass panes by means of transparent layers having the same refractive index. The surface roughness originally causing the light-diffusing effect of the glass-ceramic pane therefore does not become apparent.

The transparent intermediate layers between the glass-ceramic pane and the glass panes consist, in the known fire-retarding glass of the type described above, of an inorganic material which foams under a heat effect, in particular of hydrous sodium silicate. These intermediate layers of sodium silicate are made by casting the sodium silicate, in a form suitable for casting, containing 30 to 34% by weight of water, onto the two silicate glass panes and allowing it to dry and by subsequently joining the coated glass panes to the glass-ceramic pane in the autoclave under the effect of heat and pressure.

Fire-retarding glasses of this type have very good fireproof properties. They, nevertheless, do not have safety glass properties in terms of safety against injuries caused by splinters when the fire-retarding pane assembly breaks, for example when a person falls into a fire-retarding pane assembly of this type. In fact, the intermediate sodium silicate there does not, as such, have splinter fixation properties, as do intermediate polymer plies normally used for laminated safety glass. In many cases, however, it is desirable for fire-retarding glasses also to have safety glass properties in addition to their fireproof properties, that is to say preventing serious injuries caused by splinters when the body comes in contact with the fragmented fire-retarding glass.

Moreover, in known fire-retarding glass, the outer silicate glass panes break under shock-induced mechanical stress into large fragments which have sharp edges. Furthermore, both the two glass panes and the glass-ceramic pane have only relatively low bending strength, and this also has an adverse effect on safety glass properties because they break easily under sharp shock-induced stress.

SUMMARY OF THE INVENTION

The object of the invention is, by using a glass-ceramic pane, to develop a fire-retarding glass which has, in addition to high fire resistance, increased mechanical stability and safety glass properties against injuries caused by splinters.

According to the invention, this object is achieved in that the transparent intermediate layers between the glass-ceramic pane and the contiguous silicate glass panes consist of a thermoplastic polymer having a high splinter fixation effect, and in that the silicate glass panes are tempered thermally.

DETAILED DESCRIPTION OF THE PREFERRED EMBODIMENTS

Tempered glass panes have, as such, the advantage, as a result of their compressive prestresses in their superficial regions and in the peripheral region, of possessing greatly increased tensile strength in the peripheral region and, overall, substantially higher bending strength than normal, that is to say non-tempered, glass panes. The high compressive stress in the peripheral region results in tempered glass panes having substantially increased durability in the event of fire, because the tensions, which occur in the peripheral region due to the temperature difference between the periphery sealed in the frame and the pane surface exposed to the fire, are first compensated by the compressive prestresses, in such a way that tempered glass panes do not break until much later.

Admittedly, since a polymer is used for the intermediate layer, fireproof protection is reduced, as compared with the known fire-retarding pane assembly, because the thermal insulating capacity of the polymer which carbonizes is lower than the thermal insulating capacity of the sodium silicate layer which foams. In other respects, however, this disadvantage is at least partially compensated by means of the fire-retarding pane according to the invention, due to the fact that the intermediate plies remain intact for longer on account of the longer resistance of the tempered glass panes. By contrast, the non-tempered glass panes of the known fire-retarding glazing normally collapse after fragmentation and take away with them parts of the foaming intermediate layer, so that the latter is weakened to a greater or lesser extent and consequently loses its thermal insulating capacity.

The particular advantages of the fire-retarding glass according to the invention are that, in terms of comparable fire resistance properties, it has substantially greater stability against mechanical shocks and bending stresses and, on the other hand, also pronounced safety glass properties against injuries caused by splinters.

The tempered glass panes used may, for example, be tempered glass panes made from commercial float glass. Commercial float glass has a coefficient of thermal expansion of $>8.5 \times 10^{-6} K^{-1}$ and, due to this relatively high coefficient of thermal expansion, it may be tempered by means of conventional tempering installations such that it is capable of achieving bending strengths rising to 200 N/mm$^2$, measured according to DIN 52303 or EN 12150. Such tempered float glass panes divide into small harmless grains of glass when they are fragmented. In other respects, however, float glass panes lose their stability owing to their relatively low softening temperature of about 730° C., so that the thermal insulating effect of the carbonized intermediate ply is lost when float glass panes release the intermediate ply as a result of their softening. It is possible, however, to use tempered glass panes made from glasses which have a coefficient of thermal expansion $\alpha_{20-300}$ of $>8.5\times10^{-6}K^{-1}$, in particular of 6 to 8.5×, $10^{-6}K^{-1}$, and a softening point of 750 to 830° C. These glasses, on the one hand, can be sufficiently tempered by means of existing tempering installations to have the required safety glass properties and, on the other hand, a markedly higher softening temperature, so that their stability is appreciably longer in the event of a fire.

The most varied polymer sheets available on the market may be used as thermoplastic intermediate layers, as long as they have the splinter fixation effect required for safety glass. The intermediate thermoplastic plies may consist either of the same or different materials. Sheets of polyvinyl butyral (PVB), polyurethane (TPU), copolymers of ethylene and vinyl acetate (EVA) or fluorinated hydrocarbons (THV) come under consideration, in particular, for this purpose. The advantage of THV sheets, in particular, is that they are hardly inflammable. In the event of a fire, virtually no inflammable decomposition product is formed when these sheets are used.

Two practical examples of fire-retarding glasses according to the invention are described in more detail below.

EXAMPLE 1

A laminated glass pane assembly having surface dimensions of 1.33×0.75 m² was manufactured from a glass-ceramic pane having a thickness of 5 mm (KERALITE from the company KERAGLASS, France), from two outer glass sheets, each having a thickness of 5 mm, made of thermally tempered float glass, and from two PVP sheets, each having a thickness of 0.38 mm, according to a known autoclave method under the effects of heat and pressure.

The laminated glass pane assembly was mounted in a conventional steel frame, with a surround of 12 mm, and was introduced into an open-flame furnace, in which the fire test was conducted for DIN 4102 or ISO/DIS 834-1 according to the so-called standard temperature curve (ETK).

10 minutes after the start of the fire test, the glass sheet facing the fire crumbled. The PVB, thus released, caught fire and decomposed. The glass-ceramic pane and the tempered glass pane away from the fire did not break and consequently ensured that the furnace chamber was completely leaktight. The fire test was interrupted after 45 minutes. The glass-ceramic pane had a temperature of 805° C. at the end of the fire test. Immediately after the burner stopped, the fire-retarding glazing was cooled violently from outside by means of a strong jet of water. The outer tempered glass pane was immediately fragmented. The glass-ceramic pane, nevertheless, withstood the jet of water without breaking.

EXAMPLE 2

A laminated glass pane assembly having surface dimensions of 1.33×0.75 m² was manufactured from the same glass panes and a glass-ceramic pane as in Example 1, which, however, in this case were joined together by means of thermal plastic sheets having a thickness of 0.5 mm, formed from a fluorinated hydrocarbon polymer (THV product from the company DYNEON, Germany), by means of an autoclave method under the effects of heat and pressure.

This laminated glass pane assembly was subjected, once again, to the fire test in an open-flame furnace, as in Example 1.

About 12 minutes after the start of the fire test, the tempered glass pane facing the fire crumbled, so that the thermoplastic sheet arranged on the same side as the fire was exposed to the latter. However, the material of the sheet did not catch fire, but experienced slow thermal decomposition. No release of gaseous and/or combustible decomposition products outside the furnace in the region of the frame gripping the laminated glass pane assembly was observed. The fire test was interrupted after 95 minutes. At this moment, the glass-ceramic pane and the outer glass pane were still intact and, in the meantime, had reached a temperature of 830° C.

Immediately after the burner stopped, the fire-retarding pane was cooled violently from outside by means of a jet of extinguishing water. The outer glass pane then broke immediately. However, the glass-ceramic pane withstood the jet of water, without breaking, and, from then on, ensured that the chamber was sealed off intact.

What is claimed is:

1. Fire-resistant laminated glass pane assembly consisting essentially of a glass-ceramic pane having first and second surfaces, a first sheet of thermoplastic polymer adhered to the first surface and a second sheet of a thermoplastic polymer adhered to the second surface, and two thermally tempered silicate glass panes, one adhered to the first thermoplastic sheet and one adhered to the second thermoplastic sheet, wherein each of the first and second polymer sheets has a refractive index which is essentially the same as that of the glass-ceramic pane.

2. Fire-resistant laminated glass pane assembly according to claim 1, wherein each of the thermoplastic intermediate layers is polyvinylbutyral, polyurethane, a copolymer of ethylene and vinyl acetate or a fluorinated hydrocarbon copolymer.

3. Fire-resistant laminated glass pane assembly according to claim 1, wherein each thermally tempered silicate glass pane has a coefficient of thermal expansion of $>8.5\times10^{-6}K^{-1}$ and a softening temperature of about 730° C.

4. Fire-resistant laminated glass pane assembly according to claim 3, wherein the thermally tempered glass panes has a coefficient of thermal expansion $\alpha_{20-300}$ of 6 to $8.5\times10^{-6}K^{-1}$ and a softening temperature of 750 to 830° C.

5. Fire-resistant laminated glass pane assembly according to claim 4, wherein each thermoplastic intermediate layer is polyvinylbutyral, polyurethane, a copolymer of ethylene and vinyl acetate or a fluorinated hydrocarbon copolymer.

6. A fire-resistant laminated glass pane assembly suitable for mounting in a frame comprising a glass-ceramic pane having first and second surfaces; a first sheet of thermoplastic polymer adhered to the first surface and a second sheet of a thermoplastic polymer adhered to the second surface; a first thermally tempered silicate glass pane having a third and a fourth side, wherein the third side is adhered to the first thermoplastic sheet and the fourth side is exposed; and a second thermally tempered silicate glass pane having a fifth and a sixth side wherein the fifth side is adhered to the second thermoplastic sheet and the sixth side is exposed, and wherein each of the first and second polymer sheets has a refractive index which is essentially the same as that of the glass-ceramic pane.

7. Fire-resistant laminated glass pane assembly according to claim 6, wherein each of the thermoplastic intermediate layers is polyvinylbutyral, polyurethane, a copolymer of ethylene and vinyl acetate or a fluorinated hydrocarbon copolymer.

8. Fire-resistant laminated glass pane assembly according to claim 6, wherein each thermally tempered silicate glass pane has a coefficient of thermal expansion of $>8.5\times10^{-6}K^{-1}$ and a softening temperature of about 730° C.

9. Fire-resistant laminated glass pane assembly according to claim 8, wherein the thermally tempered glass panes has a coefficient of thermal expansion $\alpha_{20-300}$ of 6 to $8.5\times10^{-6}K^{-1}$ and a softening temperature of 750 to 830° C.

10. Fire-resistant laminated glass pane assembly according to claim 9, wherein each thermoplastic intermediate layer is polyvinylbutyral, polyurethane, a copolymer of ethylene and vinyl acetate or a fluorinated hydrocarbon copolymer.

* * * * *